(12) United States Patent
Daffin, III

(10) Patent No.: US 7,525,058 B1
(45) Date of Patent: Apr. 28, 2009

(54) LIGHT SWITCH WITH AUTOMATIC TURN OFF

(75) Inventor: Charles Ernest Daffin, III, 5018 Bradfordville Rd., Tallahassee, FL (US) 32309

(73) Assignee: Charles Ernest Daffin, III, Tallahassee, FL (US)

( * ) Notice: Subject to any disclaimer, the term of this patent is extended or adjusted under 35 U.S.C. 154(b) by 0 days.

(21) Appl. No.: 12/148,262

(22) Filed: Apr. 18, 2008

(51) Int. Cl.
*H01H 3/20* (2006.01)
*H01H 7/00* (2006.01)

(52) U.S. Cl. .................. 200/331; 200/33 R; 200/38 R; 307/141

(58) Field of Classification Search .................. 200/330, 200/331, 329, 11 R, 19 R, 20, 21, 28, 30 R, 200/19 A, 33 R, 35 R, 36, 38 R–38 E, 39 R, 200/40; 307/112, 116, 126, 119, 122, 134, 307/139–141, 141.4, 149, 150; 315/149, 315/159, 362, 150, 151; 174/66, 67; 340/521
See application file for complete search history.

(56) References Cited

U.S. PATENT DOCUMENTS

| 3,985,982 | A | * | 10/1976 | Schneidinger | 200/33 R |
| 4,912,376 | A | * | 3/1990 | Strick | 315/362 |
| 5,306,957 | A | * | 4/1994 | Ellingham et al. | 307/141 |
| 5,465,031 | A | * | 11/1995 | Nilssen | 315/362 |
| 5,473,204 | A | * | 12/1995 | Temple | 307/141 |
| 5,719,362 | A | * | 2/1998 | Gray, Jr. | 200/38 R |
| 5,828,018 | A | * | 10/1998 | Cooper | 200/33 R |
| 5,898,240 | A | * | 4/1999 | Tsou | 307/141 |
| 6,121,889 | A | * | 9/2000 | Janda et al. | 340/815.47 |
| 6,891,284 | B2 | * | 5/2005 | Tilley | 307/116 |
| 7,244,900 | B1 | * | 7/2007 | Gray, Jr. | 200/331 |

* cited by examiner

*Primary Examiner*—Michael A Friedhofer

(57) ABSTRACT

A "light switch" that is the most common and easiest to operate. The toggle switch, rocker switch or paddle switch, is used for turning on and off 110 volt ac lights. The switch can be preset, before installation, to a time duration keeping lights on from five minutes to eight hours. After the preset time expires the toggle flips to the "off" position. Optional connections for low voltage control wires enable the switch to also be toggled on and off by a remote or outside source.

8 Claims, 3 Drawing Sheets

LIGHT SWITCH WITH AUTOMATIC TURN OFF

FIELD OF THE INVENTION

The present invention relates to 'light switches' and, more particularly, to a switch that turns itself off.

BACKGROUND OF THE INVENTION

The most common light switch in a home, residence and even commercial buildings, is the toggle switch. The switch is manually turned on by human hand and then has to be turned off, manually, by hand. Similarly is the "rocker" and "push" switch. These are the most common because of their simplicity. You do not have to look at the switch or even think. It is so simple.

The problem is the switch depends on a human to turn it off. I need a switch that will turn itself off. For example, I have a home for sale that i do not occupy.

I only go by and check the home every three days to weekly. A Realtor entering the home and showing it to a client will turn on lights throughout the house.

When they leave, lights are left on. Particularly outside flood lights. When people flip switches to turn on lights during the day, they don't realize the outside flood lights have been turned on. And if you leave the house during the daylight, you would never know they are on. Other problem lights would be closets, bedrooms, stairs, garage & attics. Attic lights can be left on for months without notice. Now after three days to a week of these lights, especially two to twelve 100 watt flood lights, left on, I have a huge power bill. It is also a needless waste of precious power. Outside lights left on all night can also be very annoying to others in a neighborhood. Persons living next door or in front and behind, where flood lights might be directed. The problem—since people are forgetfully, including myself, and cannot be depended upon to turn lights off, I need a switch that turns itself off. And most important, "Keep It Simple".

The switch also needs to be somewhat tamper proof. The time set would be set by homeowner and others could not, easily, change. You would have to remove the cover plate in order to adjust the time.

Examples would be a stair switch set for one minute "on" before auto cutoff. Closet light five minutes. Garage light, thirty minutes. Attic light, one hour. Outside flood lights, four hours. Etc.

Some examples of items/inventions that are similar but different.

1) Mini Lamp/Appliance Timer. Is a manual dial timer. Difference—You have to look at it to set time. Which also takes extra time to turn on. Does not conform to standard 2×4 roughin box.

2) The closest product I could find is the Intermatic Digital Wall Switch Timer. Difference—It is a push button instead of "toggle or rocker" switch. It has a digital viewing window. It is complicated to set up. You have to read and comprehend four pages of instructions. It also requires a back up battery. Anyone can easily tamper with it & reset times.

Different from the Intermatic products, the proposed invention is "Toggle" or "Rocker" switch. The most common & easiest to use.

Has simple, manual screwdriver time set.

A person cannot, "tamper", reset the switch times unless they take the cover off the switch with a screwdriver which requires more effort than is worth the trouble to most persons.

Requires no battery's

So simple, needs no instructions.

3) Intermatic Countdown Timer—Difference—It is not "toggle" switch. Have to look at it and think each time it is turned on. Choosing the time setting each time.

.Other inventions do not have the ease and simplicity of use.

1) These other switches take extra time & brain power (look & think) to operate. It needs to be a simple operation to activate with out even thinking. A switch a child or Cave Man can operate.

People enjoy the simplicity of the toggle, and like kind, switch. You do not have to look at it to turn it on. It takes a quick, single motion of hand/finger to operate. You don't even have think about it. The toggle is a easier hand motion than locating a push button and pushing it in.

2) They do not have a set time for cutoff. You set the time you want each time it is turned on. And/Or the time needs to be preset by owner and made so it is not easily changed. Tamper proof.

3) Needs to conform, fit inside, to the standard 2×4 roughin box. Not all other timers fit.

4) People want "out of the box" simple to use. They do not want to have to read instructions.

It would be advantageous to provide a light switch, being the same standard, simple, toggle design, would turn itself off at the owners pre set time duration since people are forgetful about turning lights off.

It would also be advantageous to provide a timer switch that only the owner could preset and control the time durations.

It would further be advantageous to provide a light switch that saved money on utility bills and overall power consumption.

Also advantageous to have same light switch so simple it required no instructions. Use right out of the box just as existing, non timed, switches And such switch would have optional low voltage on/off control from outside source or remote panel

SUMMARY OF THE INVENTION

In accordance with the present invention, there is provided a "light switch" that is the most common and easiest to operate. The toggle switch is used for turning on and off 110 volt ac lights, appliances & equipment. The switch can be preset, before installation, to a time duration keeping lights on from five minutes to eight hours. After the preset time expires the toggle flips to the "off" position. Also has optional outside remote control of "ON"/"OFF".

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
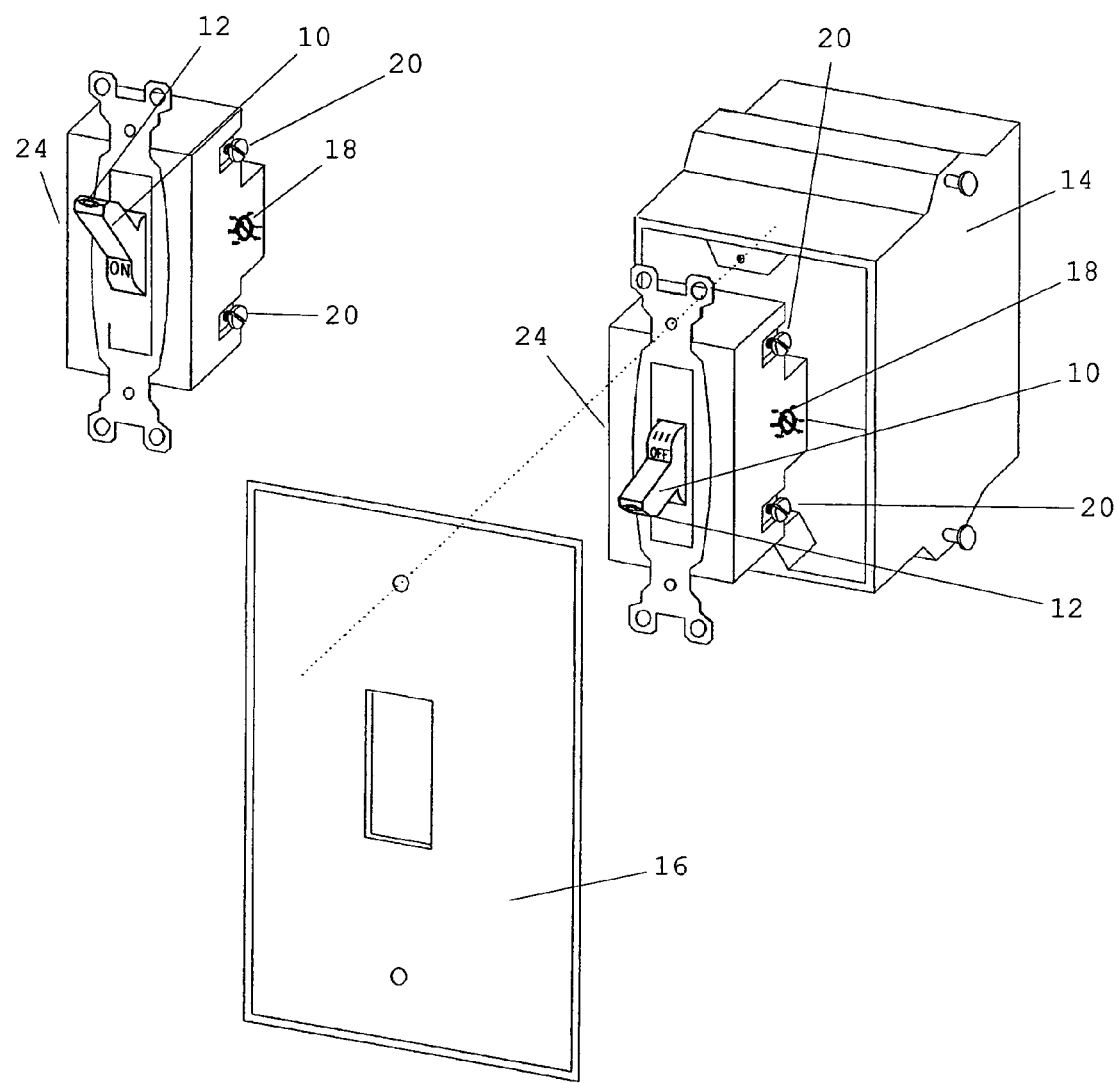
FIG. 1 is a perspective view of a light switch with timer and automatic turn off.

FIG. 1 is a front perspective view of a light switch with timer 18 and automatic turn off 22. When the toggle switch 10 or rocker switch is manually pushed to the "ON" position the timer 18 is activated. The 110 volt power is now 'flowing' through the two 110V power connections 20. The timer 18 will now wait the pre set time. The pre set time being one minute to eight hours plus. The timer 18 was set to a time duration with a screw driver as shown in FIG. '2'. The access to the timer 18 setting screw or control slot is concealed behind the standard switch coverplate 16.

After the time has expired, the time set on the timer 18, from activation, the automatic turn off 22 is processed pushing the toggle switch 10 back to the "OFF" position. The electrical power to a light or equipment is disconnected. Power is no longer 'flowing' through the two 110V power connections 20. This process repeats any time the switch is manually pushed to the "ON" position. The switch has a hole 12 or indention with color code so it will be recognized as an "Automatic Turn Off 22" switch. The entire switch, timer 18, relay or mechanical activators must be able to fit into a 2×4 standard roughin box 14.

Figure 2:
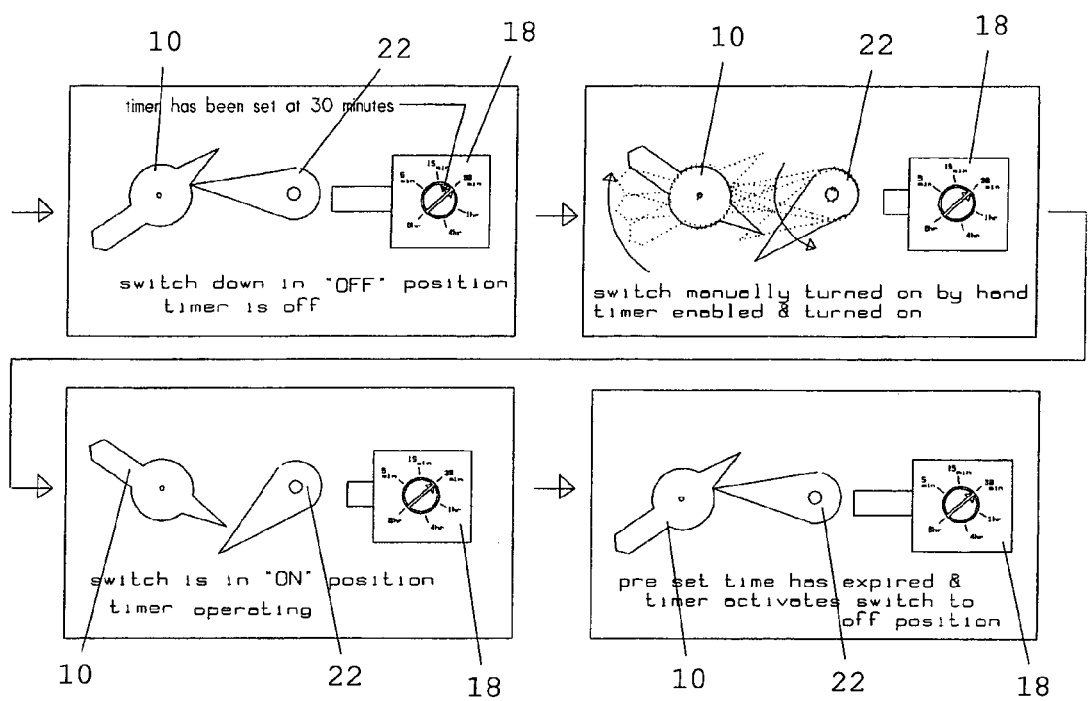
FIG. 2 is a plan view of a function of the switch. manual turn "on". timer duration then automatic turn "off"

FIG. 2 is a plan view of a function of the switch. manual turn "on". timer 18 duration then automatic turn "off".

Figure 3:
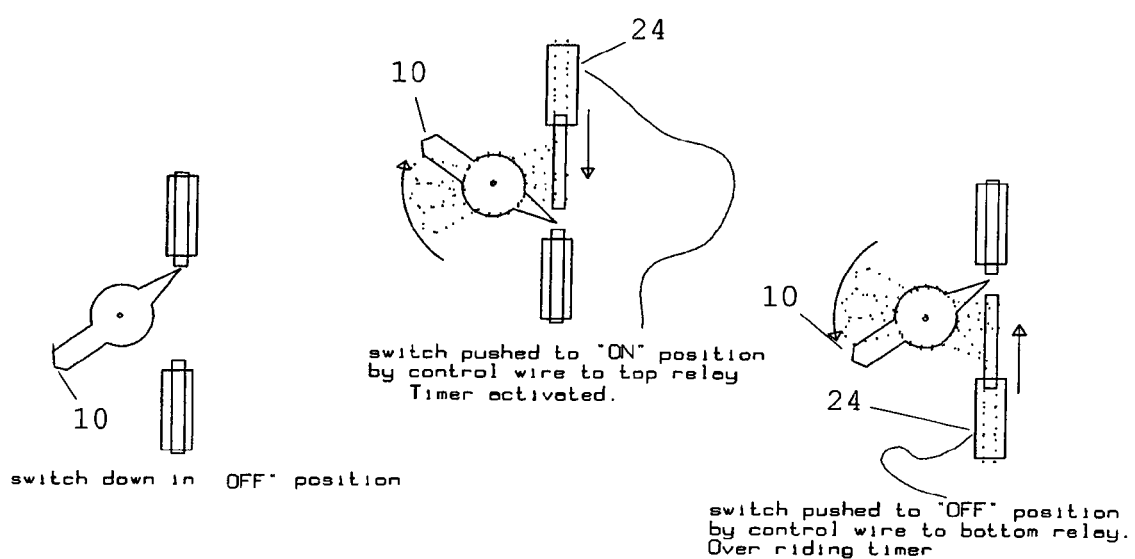
FIG. 3 is a plan view of a switch pushed to "on" and "off" positions by relay's controlled by outside source.

FIG. 3 is a plan view of the switch pushed to "ON" and "OFF" positions by an outside source. The low voltage wires are connected to the control wire connection 24 on the switch. This allows the switch to have optional "ON"/"OFF" control from a remote panel or controller. Relay's or other mechanical devices are activated by low voltage wires connected to the "ON" and "OFF" relays. Timer 18 is still activated when switch moves to "ON" position.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

The invention claimed is:

1. A light switch with automatic turn off for a light that turns off after a predetermined period of time, comprising:
   means for turning power on and turning power off;
   means for distinguishing the switch from a common switch by feel or sight;
   means after manual turn "on", for allowing the power to stay on for a preset duration from 5 minutes to 8 hours, activating an "automatic turn off";
   means for moving the switch back to "off" position, rigidly connected to said means after manual turn "on", for allowing the power on for the preset duration of 5 minutes to 8 hours, then activating the "automatic turn off", and rigidly connected to said means for turning power on and turning power off; and
   means for allowing an optional connection and control of the on and off positions by a remote panel or outside source, rigidly connected to said means for turning power on and turning power off.

2. The light switch with automatic turn off in accordance with claim 1, wherein said means for turning power on and turning power off comprises a switch toggle switch.

3. The light switch with automatic turn off in accordance with claim 1, wherein said means for distinguishing the switch from common switch by feel or sight comprises a recessed hole.

4. The light switch with automatic turn off in accordance with claim 1, wherein said means after manual turn "on", allows power on for the pre set preset duration from 5 minutes to 8 hours, then to activate activates the "automatic turn off" comprises a screwdriver adjustment timer.

5. The light switch with automatic turn off in accordance with claim 1, wherein said means for moving the switch back to the "off" position comprises an automatic turn off.

6. The light switch with automatic turn off in accordance with claim 1, wherein said means allowing the optional connection and control of the on and off positions by a remote panel or outside source comprises a screw connection for control wire control wire connection.

7. A light switch with automatic turn off for a light switch that turns off after a predetermined period of time, comprising:
   a toggle switch, for turning power on and turning power off;
   a recessed hole, for distinguishing the switch from common switch by feel or sight
   a screwdriver adjustment timer, for after manual turn "on", allowing power on for a preset duration from 5 minutes to 8 hours, then activating an "automatic turn off";
   an automatic turn off, for moving the toggle switch back to the "off" position, rigidly connected to said timer, and rigidly connected to said toggle switch; and a screw connection for control wire control wire connection, for allowing an optional connection and control of the on and off positions by a remote panel or outside source, rigidly connected to said toggle switch.

8. A light switch with automatic turn off for a light switch that turns off after a predetermined period of time, comprising:
   a toggle switch, for turning power on and turning power off;
   a recessed hole, for distinguishing the toggle switch from common switch by feel or sight
   a screwdriver adjustment timer, for after manual turn "on", allowing power on for a preset duration from 5 minutes to 8 hours, then activating an "automatic turn off";
   an automatic turn off, for moving the toggle switch back to the "off" position, rigidly connected to said timer, and rigidly connected to said toggle switch; and
   a screw connection for control wire control wire connection, allowing an optional connection and control of the on and off positions by a remote panel or outside source, rigidly connected to said toggle switch.

* * * * *